United States Patent Office.

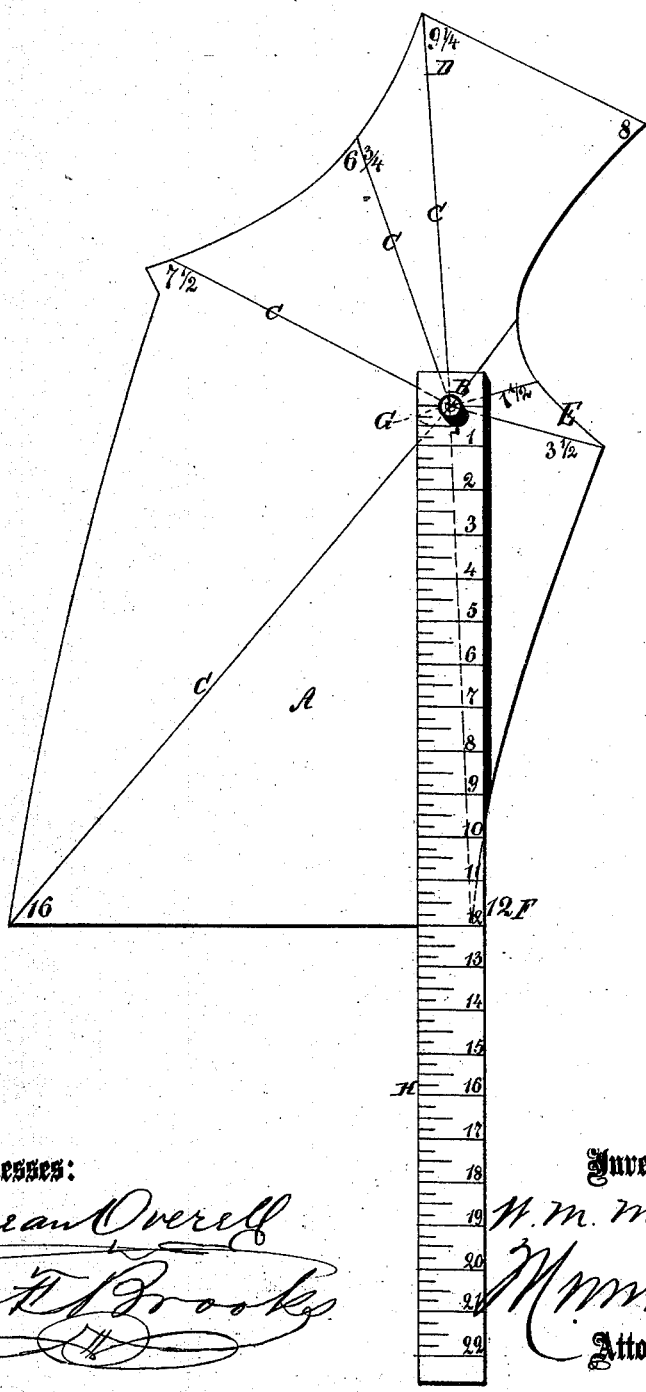

WILLIAM M. MICHAEL, OF INDIANA, PENNSYLVANIA.

Letters Patent No. 97,672, dated December 7, 1869.

IMPROVEMENT IN PATTERNS FOR LAYING OUT GARMENTS.

The Schedule referred to in these Letters Patent and making part of the same

*To all whom it may concern:*

Be it known that I, WILLIAM M. MICHAEL, of Indiana, in the county of Indiana, and State of Pennsylvania, have invented a new and improved Mode of Laying out Garments; and I do hereby declare that the following is a full, clear, and exact description thereof, which will enable others skilled in the art to make and use the same, reference being had to the accompanying drawings, forming part of this specification.

This invention relates to an improved mode of laying out garments for cutting, and in patterns and scales for carrying out the same.

The invention comprises a mode of laying out the different parts of a garment by lines and measures, from a central point within the said parts, by means of patterns for each part of the garments, and a scale bearing the relations to the different measurements of the person to be fitted, as hereinafter described.

The drawing represents a plan view of a pattern, such as I employ for the fore part of a vest; also, a plan view of a scale (reduced in size) for indicating the measures.

For any part of a garment, for instance, the fore part of a vest, I make a pattern, A, of the exact form, though smaller than the full size for the said part, preferably on a scale of one-third the medium size.

On this, I establish a centre at B, and make a small hole through it at the said centre.

I also draw the lines C from the centre, to the prominent points or corners of the pattern, as many as may be found most convenient.

I then divide the measure, of the medium circumference at the breast of a man, into the number of parts and fractions of parts, as below. For instance, the measure of the said medium circumference is, say, thirty-four inches; this I divide into equal parts of about nine-tenths of an inch, and each part into four or more fractional parts. I then make a scale with these divisions and parts of divisions, of the length of twenty-two of the said divisions.

I then ascertain, by measurement taken upon a part of a garment, previously cut by any rule corresponding to the one for which the pattern in hand is designed, both in shape and size, how many of these parts or divisions on the scale it takes to measure the said part on all the lines from the centre B to the exterior points; and I set the measures for each line so obtained, on the pattern A, by the side of the respective lines to which they belong. For instance, from the centre B to the top of the front part of a vest, for a person thirty-four inches around the breast, the scale having the said twenty-two parts, shows, by actual measure on the part already cut by any rule, to be nine and one-quarter parts, which is placed at the outer extremity of the pattern on the line C, running to the top at D. From the said centre to the point which comes under the arm, the measure is three and one-half parts, as at E. From the centre to the bottom rear corner, the distance is represented by twelve parts, as at F, and so on.

Now, by this pattern, which, as above stated, I prefer to make about one-third the scale of the part of the garment, and this rule I lay out vests for persons of any size, in the following way:

Assuming the measure of the person to be, around the breast, thirty-four inches, which may be considered the medium size, I first find the centre B, to measure from, by measuring down from the top of the cloth, nine and one-quarter parts, as indicated by the pattern A, and make a mark opposite this mark; and from the front of the cloth and the operator, as it lies on the table, I measure three and one-half parts, finding the required central point; here I place a small flat-headed rivet, G, with the point upward, and over this, I lay the pattern A, taking care to range the lines at D and E, properly toward the top and front. Then, with the scale H, or any other straight rule, placed parallel with the lines C, I mark coincident lines on the cloth. Then, engaging the scale H with the rivet, I measure off the distance on the lines indicated by the figures at each line, marking the cloth, and from these points so marked, the straight and curved lines for the edges of the part of the garment may be struck with straight edges, sweeps, curves, or in any of the well-known ways.

If the circumference of the person, however, measures more than thirty-four inches, by one or more inches, then I increase the measures on the lines by one or more parts on the scale, and if less, I diminish the measures in the same way.

This mode is alike applicable to all parts of garments, whether of coats, vests, pantaloons, ladies' dresses, or others, and I employ it in laying out the several parts of all, making suitable patterns for each particular part; but upon the same plan and using the same scale, which I have found corresponds most nearly to the proportionate variations of the measures of the different parts of the human body.

Having thus described my invention,

What I claim as new, and desire to secure by Letters Patent, is—

The combination of the pattern A and scale H, the former having the lines C and central point G delineated thereon, and the latter being graduated as described, the two arranged for joint operation, as specified.

WM. M. MICHAEL.

Vitnesses:
GEO. E. SMITH,
WM. R. BLACK.